(12) United States Patent
Kalbarga

(10) Patent No.: US 7,975,084 B1
(45) Date of Patent: Jul. 5, 2011

(54) CONFIGURING A HOST COMPUTER USING A SERVICE PROCESSOR

(75) Inventor: Subash Kalbarga, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 83 days.

(21) Appl. No.: 12/026,940

(22) Filed: Feb. 6, 2008

(51) Int. Cl.
G06F 13/00 (2006.01)
G06F 3/00 (2006.01)
G06F 9/00 (2006.01)
G06F 15/177 (2006.01)

(52) U.S. Cl. ............................ 710/104; 710/13; 713/1
(58) Field of Classification Search ............ 710/13, 710/104; 713/1
See application file for complete search history.

(56) References Cited

U.S. PATENT DOCUMENTS

| | | | | |
|---|---|---|---|---|
| 5,887,164 | A * | 3/1999 | Gupta | 713/2 |
| 6,993,642 | B2 * | 1/2006 | Burkhardt et al. | 713/1 |
| 7,099,967 | B2 * | 8/2006 | Farkas et al. | 710/104 |
| 7,219,261 | B2 * | 5/2007 | Tada et al. | 714/15 |
| 2003/0018889 | A1 * | 1/2003 | Burnett et al. | 713/153 |
| 2004/0034763 | A1 * | 2/2004 | McCardle | 713/1 |
| 2005/0044348 | A1 * | 2/2005 | O'Connell | 713/1 |
| 2005/0240669 | A1 * | 10/2005 | Khanna et al. | 709/225 |
| 2008/0052507 | A1 * | 2/2008 | Chow et al. | 713/2 |
| 2008/0082813 | A1 * | 4/2008 | Chow et al. | 713/2 |
| 2008/0086719 | A1 * | 4/2008 | Clemenceau et al. | 717/121 |
| 2008/0148031 | A1 * | 6/2008 | Brown et al. | 713/1 |

OTHER PUBLICATIONS

Booth, RC et al., "Extended Functions of a Service Processor", IBM, Apr. 1, 1985, pp. 1-4 http://priorartdatabase.com/IPCOM/000063769.*
IBM, "Help Desk Access over LAN", Jun. 11, 2002, pp. 1-4 http://priorartdatabase.com/IPCOM/000015678.*

* cited by examiner

Primary Examiner — Tariq Hafiz
Assistant Examiner — Dayton Lewis-Taylor
(74) Attorney, Agent, or Firm — Morris Manning & Martin LLP; Tim Tingkang Xia, Esq.

(57) ABSTRACT

Technologies are provided herein for configuring aspects of the operation of a server computer using a service processor. The service processor includes a processor, a NAND flash memory organized using a file system, and a hardware data communications interface coupled to the host computer. The file system is utilized to store a monolithic image file containing software components for configuring the operation of the host computer and the service processor. A firmware is also provided that executes on the processor to expose the NAND flash memory to the host processor as a storage device on the hardware interface, to receive storage requests from the host computer, and to generate offsets into the monolithic image file for performing the storage requests. The image file may be utilized to store an operating system, hardware drivers, and a host configuration tool executable by the host computer.

18 Claims, 9 Drawing Sheets

CONFIGURING A HOST COMPUTER USING A SERVICE PROCESSOR

BACKGROUND

Modern server computer installations may include hundreds or even thousands of computer systems. Management of such a large number of computer systems is very difficult. One particularly challenging aspect of the management of a large server computer installation is the process of configuring the operation of a large number of server computers. It is often an extremely tedious and time-consuming process to configure aspects of the operation of a large number of server computers, especially when the server computers are located in different geographic locations.

One reason it is often difficult to configure the operation of a large number of server computers is that the pre-boot environment provided by a typical server computer is often very limited. For instance, basic input/output system ("BIOS") or Extensible Firmware Interface ("EFI")-level configuration utilities are often severely memory-limited and, as a result, are restricted in the functionality they can provide for configuring the operation of a server computer. Moreover, it is often impossible in these pre-boot environments to configure custom hardware, such as a redundant array of inexpensive disks ("RAID") controller card, due to the inability to use hardware drivers in the pre-boot environment that are specific to the custom hardware. In general, current pre-boot environments are severely restricted in their ability to provide meaningful tools for configuring a server computer.

It is with respect to these considerations and others that the disclosure presented herein has been made.

SUMMARY

Technologies are provided herein for configuring aspects of the operation of a server computer using a service processor. In particular, through the use of the technologies provided herein, network-aware enhanced configuration tools provided by a service processor can be utilized on a host computer for configuring and managing aspects of the operation of the host computer. The enhanced configuration tools can utilize pre-existing hardware drivers, provide a robust graphical user interface ("GUI"), and provide for the configuration of a host computer through the use of scripts.

According to one aspect presented herein, a service processor (also referred to herein as a "baseboard management controller" or "BMC") is provided for use within a host computer system. While service processors have been previously limited to providing functionality for emergency management and remote connectivity, the advanced service processor described herein provides network-aware configuration tools for configuring and managing a host computer and the service processor itself. These network-aware configuration tools provide significant advanced functionality as compared to the configuration tools available in previous pre-boot environments.

In one aspect presented herein, the service processor includes a processor, a NAND flash memory organized using a file system, and a hardware data communications interface coupled to the host computer such as a Universal Serial Bus ("USB") interface. The file system is utilized to store a monolithic image file containing software components for configuring the operation of the host computer and the service processor. A firmware is also provided that executes on the processor to expose the NAND flash memory to the host processor as a storage device on the hardware interface, to receive storage requests from the host computer, and to generate offsets into the monolithic image file for performing the storage requests. For instance, appropriate offsets may be generated into the image file to perform read and write requests received from the host computer.

According to other aspects, the image file is utilized to store an operating system and hardware drivers executable by the host computer. The operating system is a small footprint operating system suitable for storage in and execution from the NAND flash memory. The service processor can instruct the host computer to restart and to boot from the operating system stored on the service processor. In this regard, the image file may further store a host configuration tool executable by the host computer. When the host computer boots from the NAND flash memory on the service processor, the host configuration tool is executed to configure aspects of the operation of the host computer. For instance, the configuration tool may change firmware settings, hardware settings, and other configuration parameters utilized by the host computer. A Web browser program may be stored in the image file and utilized by the host configuration tool to provide a robust GUI for configuring the operation of the host computer.

According to additional aspects, the image file stores a host firmware runtime application programming interface ("API") that provides software interfaces for configuring the firmware of the host computer. The host configuration tool utilizes the host firmware runtime API to configure the host firmware. For instance, in one implementation the service processor obtains an updated firmware for the host computer from a configuration server and stores the updated firmware in the image file. The host configuration tool may then utilize the host firmware runtime API and the updated firmware to update the firmware of the host computer.

According to other aspects, the image file may further store a service processor runtime API that provides software interfaces for configuring aspects of the operation of the service processor. The host configuration tool may utilize the service processor runtime API to configure aspects of the operation of the service processor. The image file may also store scripts executable by the host computer for configuring aspects of the operation of the host computer. In this manner, configuration activities can be automated through the use of the scripts. The service processor may be configured to periodically obtain updated scripts from a configuration server and store the scripts in the image file for execution by the host computer.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for configuring a host computer using a service processor. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments.

Figure 1:
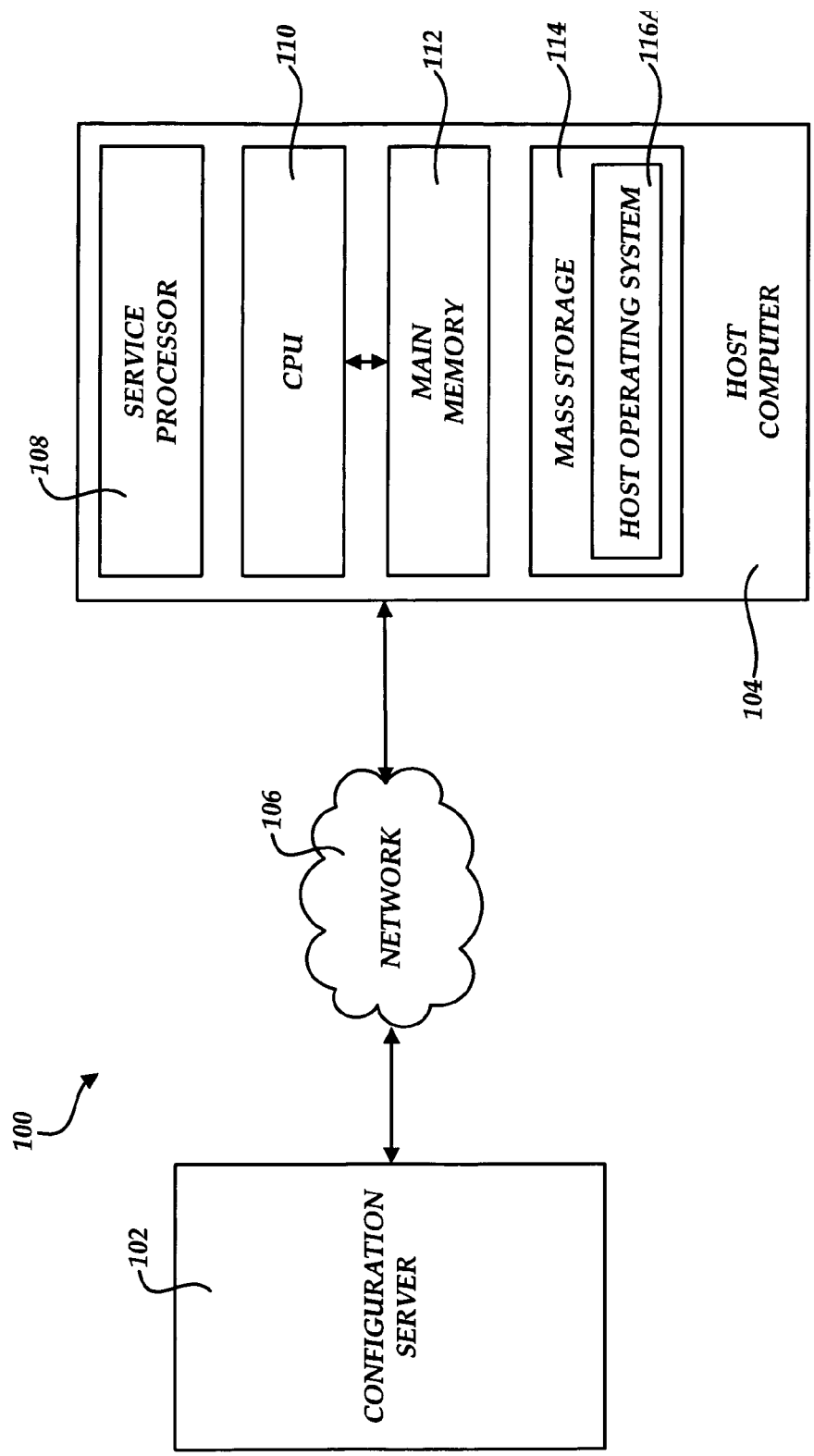
FIG. 1 is a computer architecture and network diagram illustrating aspects of a configuration server and a host computer provided in one embodiment presented herein.

FIG. 1 is a network diagram showing a system 100 provided herein that includes a configuration server 102 and a host computer 104 communicatively coupled via a network 106. The network 106 may be a local area network ("LAN"), a wide area network ("WAN") such as the Internet, or other type of network. The host computer 104 comprises a network-enabled server computer equipped with a service processor 108. The service processor 108 is a specialized microcontroller that is configured to monitor and control aspects of the operation of the host computer 104. As described in greater detail below, the service processor 108 provided herein is also operable to configure aspects of the operation of the host computer 104.

According to aspects, the service processor 108 is configured to monitor operating and performance-related parameters received from various software and hardware components of the host computer 104, referred to herein as "managed entities" or "targets." For example, the service processor 108 may monitor health-related aspects associated with the host computer 104, such as temperature, cooling fan speeds, power mode, operating system status, and other parameters within the host computer 104. The service processor 108 monitors sensors to obtain this information and may transmit an alert to a system administrator if any of the parameters exceed preset limits. A system administrator may also communicate with the service processor 108 to take some corrective action such as resetting or power cycling the host computer 104. Communication with the service processor 108 is possible even if an operating system executing on the host computer 104 has not yet been installed or is corrupted.

According to embodiments, the operation of the service processor 108 adheres to the Intelligent Platform Management Interface ("IPMI") industry standard for system monitoring and event recovery. Through the IPMI interface, the service processor 108 can instruct the host computer 104 to take certain actions. For instance, as described in greater detail below, the service processor 108 may instruct the host computer 104 to restart itself and boot from an operating system contained on the service processor 108. In order to provide this functionality, the service processor 108 is communicatively connected to one or more components within the host computer 104 either directly or by way of a system management bus. In addition, the service processor 108 may also be configured with its own network interface card ("NIC") for direct communication with computer systems on the network 106, such as the configuration server 102.

As shown in FIG. 1, the host computer 104 includes a number of conventional computing components such as a central processing unit ("CPU") a main memory 112. The host computer 104 also includes a mass storage device 114, such as a hard disk device, that stores a host operating system 116A. The host operating system 116A is executed by the host computer 104 to perform its primary processing tasks. For instance, according to embodiments presented herein, the host operating system 116A may comprise the LINUX operating system, the WINDOWS SERVER operating system from MICROSOFT CORPORATION, or another type of operating system suitable for controlling the operation of a server computer. The host computer 104 may also include a firmware for controlling the operation of the host computer 104 and through which aspects of its operation may be configured.

As will be discussed in greater detail below, the service processor 108 is equipped with a flash memory device that stores an operating system and a host configuration tool. The service processor 108 may instruct the host computer 104 to restart itself and boot from the operating system contained within the service processor 108. When the host computer 104 reboots in this manner, the host configuration tool is executed on the host computer 104.

Through facilities provided by the host configuration tool, aspects of the operation of the host computer 104 can be configured. Moreover, as will also be described in greater detail below, the configuration server 102 may be utilized to update the operating system, host configuration tool, scripts, and other software components stored on the service processor 108. This process may occur in an automated fashion periodically to ensure that the service processor 108 always includes up-to-date software components for configuring the operation of the host computer 104. Additional details regarding the architecture and operation of the service processor 108 are provided below with respect to FIGS. 2-8.

Figure 2:
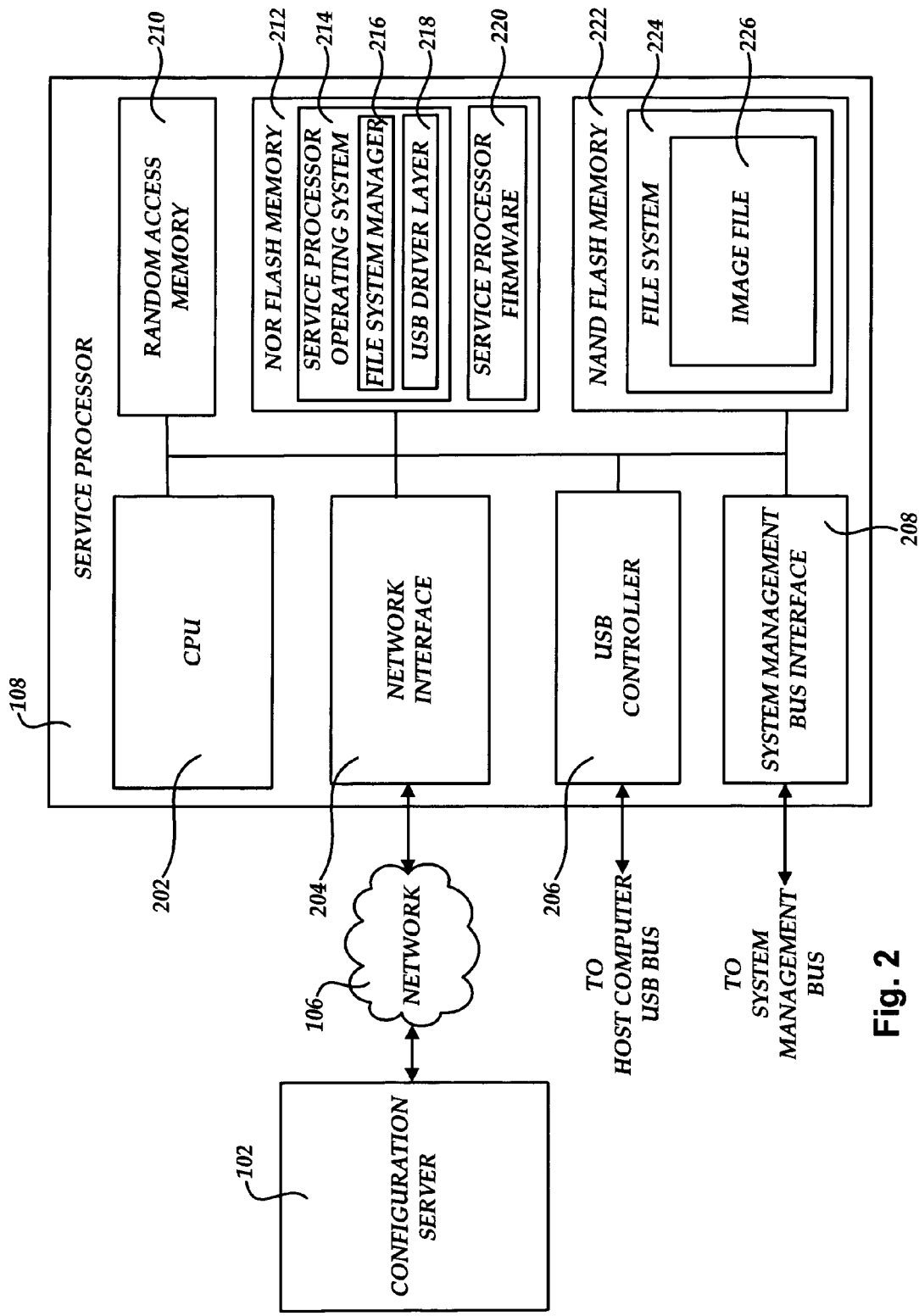
FIG. 2 is a computer architecture and network diagram showing aspects of a service processor provided in one embodiment presented herein.

FIG. 2 is a hardware architecture diagram showing additional aspects of a service processor 108 provided by embodiments described herein. In particular, the service processor 108 includes a CPU 202, random access memory 210, and a network interface 204. The network interface 204 is utilized to establish a connection to the configuration server 102 via the network 106. Other network connections may also be established for purposes of communicating with the service processor 108.

As shown in FIG. 2, the service processor 108 also includes a hardware interface coupled to the CPU 202 for communicating with the host computer 104. In particular, in one implementation the hardware interface comprises a USB controller 206 configured to communicate with the host computer 104 via a USB bus. It should be appreciated, however, that other types of hardware interfaces may be utilized for communication with the host computer 104. In one implementation, the service processor 108 also includes a system management bus interface 208 for communicating with various components within the host computer 104 on a system management bus. The system management bus may be utilized by the service processor 108 to communicate with the host computer 104, to communicate with other system management devices such as sensors, and to perform other functions.

As also shown in FIG. 2, the service processor 108 includes a NOR flash memory 212. In one implementation, the NOR flash memory 212 is operative to store a firmware 220 that controls the operation of the service processor 108. In particular, the NOR flash memory 212 may be utilized to store an operating system 214 for the service processor 108. In one embodiment, the operating system 214 comprises a small footprint LINUX operating system suitable for controlling the operation of an embedded microcontroller. Other types of small footprint operating systems may also be used similarly.

The operating system 214 includes a file system manager 216 capable of implementing a file system within memory devices contained within the service processor 108. For instance, in one implementation, a NAND flash memory 222 is also provided within the service processor 108. The available storage capacity of the NAND flash memory 222 is formatted by the file system manager 216 with a file system 224. In one embodiment, the file system 224 comprises the Journaling Flash File System, Version 2 ("JFFS, v2"). It should be appreciated, however, that other types of file systems may be utilized. The file system manager 216 may also provide functionality for compressing files stored within the file system 224. According to implementations, the file system 224 is utilized to store an image file 226. The image file 226 is a flat, monolithic image file that is utilized to store an operating system and host configuration tools for the host computer 104. Additional details regarding the contents and use of the data stored within the image file 226 are provided below with respect to FIGS. 3-8.

According to implementations, the operating system 214 also includes a USB driver layer 218. As will be discussed in greater detail below, the USB driver layer 218 is utilized to process storage requests from the host computer 104 that are received by the USB controller 206. In response to receiving a storage request, such as a read or write operation, the USB driver layer 218 generates an offset for the storage request into the image file 226. The generated offset is then utilized to locate the appropriate data within the image file 226 and to respond to the storage request. Additional details regarding this process are provided below.

It should be appreciated that although FIG. 2 illustrates the use of a NOR flash memory 212 and a NAND flash memory 222, a single NAND flash memory device 222 or other type of memory device may be utilized. Additionally, although the NAND flash memory 222 is illustrated in FIG. 2 as being integrated with the service processor 108, the NAND flash memory 222 may be external to the service processor 108 in other embodiments. For instance, a hardware interface may be provided in embodiments for communicatively coupling an external NAND flash memory, such as a USB thumb drive, to the service processor 108.

Figure 3:
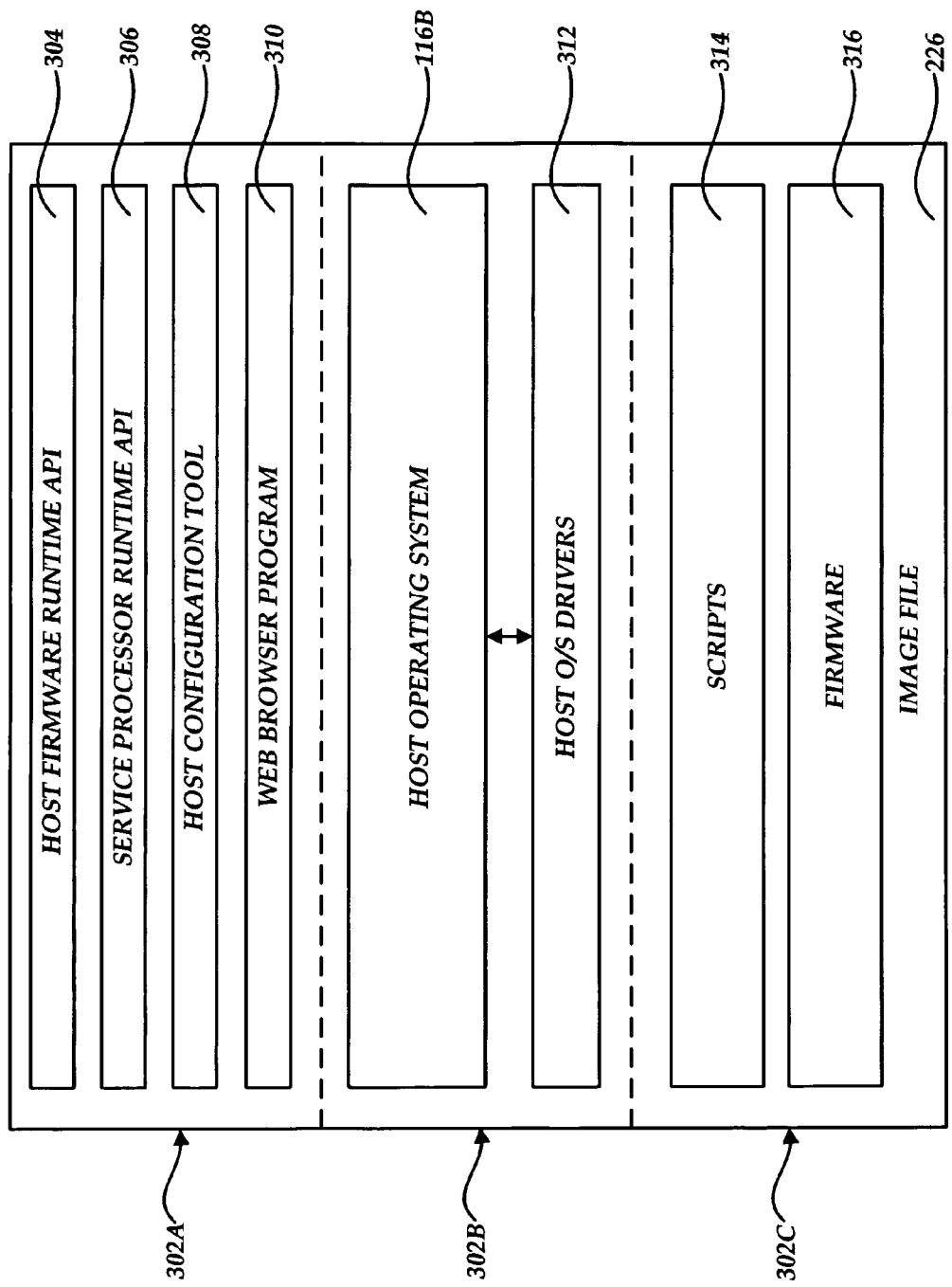
FIG. 3 is a software architecture diagram showing the contents of an image file provided in one embodiment presented herein.

FIG. 3 is a software architecture diagram showing the contents of an image file 226 provided in one embodiment presented herein. In particular, as shown in FIG. 3, the image file 226 includes a host operating system 116B. As discussed briefly above, the service processor 108 is configured in embodiments to instruct the host computer 104 to restart itself and boot from the operating system 116B stored within the image file 226. In this regard, the service processor 108 exposes the contents of the image file 226 to the host computer 104 as a mass storage device. From the perspective of the host computer 104, the contents of the image file 226 are no different than any other connected mass storage device. According the embodiments, the host operating system 116B comprises a small footprint LINUX operating system suitable for storage on a NAND flash memory 222. Other small footprint operating systems may also be utilized.

According to implementations, hardware drivers 312 are also stored in the image file 226 for use in conjunction with the host operating system 116B. The drivers 312 comprise standard hardware drivers configured for use with the host operating system 116B. In this manner, the same drivers utilized with the host operating system 116A during the normal runtime of the host computer 104 can also be used by the host operating system 116B in the pre-boot configuration environment described herein. By allowing use of the same drivers, the embodiments presented herein can save significant development time and also permit the use and configuration of a wide variety of hardware devices in the pre-boot configuration environment provided by the service processor 108.

As also shown in FIG. 3, the image file 226 may also include a host configuration tool 308. The host configuration tool 308 is a software component executable on the host operating system 116B. The host configuration tool 308 includes functionality for configuring aspects of the operation of the host computer 104. For instance, according to implementations, the host configuration tool 308 may include functionality for configuring software and hardware settings of the host computer 104, settings for a firmware utilized by the host computer 104, and functionality for updating the contents of a firmware utilized by the host computer 104.

The host configuration tool 308 may also be configured to communicate with the configuration server 102. In particular, the host configuration tool 308 communicates with the configuration server 102 to periodically retrieve an updated version of the image file 226 and to store the updated image file in the file system 224. In this manner, any data contained within the image file 226 may be periodically updated at the host computer 104. In an embodiment, the host configuration tool 308 utilizes a Web browser program 310 to provide a graphical user interface for configuring the host computer 104. The graphical user interface may be utilized by a user local to the host computer 104 or through a remotely located user through redirection facilities also provided by the service processor 108.

In order to provide the functionality described herein for configuring the various aspects of the host computer 104, the host configuration tool 308 may utilize a host firmware runtime API 304 or a service processor runtime API 306. The host firmware runtime API 304 is operative to provide one or more software interfaces for customizing aspects of the operating of a firmware utilized by the host computer 104. By providing an API 304 for interfacing with the settings utilized by the firmware of the host computer 104, programmers are freed from having to program the configuration of the host computer firmware directly. The service processor runtime API 306 provides software interfaces for configuring aspects of the operation of the service processor 108. The host configuration tool 308 may utilize the API 304 and the API 306 at runtime to configure various aspects of the operation of the host computer 104 and the service processor 108, respectively.

According to implementations, the image file 226 also stores one or more scripts 314. The scripts 314 are executable by the host configuration tool 308 or the host operating system 116B to maintain or configure aspects of the operation of the host computer 104. For instance, in one embodiment, scripts 314 are provided for performing automatic configuration of firmware settings within the host computer 104. Other types of scripts may also be utilized.

As discussed briefly above, the host configuration too 308 may utilize the services of a host firmware runtime API 304 to configure aspects of the operation of the firmware of the host computer 104. According to other embodiments, the host configuration tool 308 is also configured to update a firmware of the host computer 104 with a firmware 316 stored in the image file 226. In this manner, the service processor 108 can periodically retrieve a new firmware 316 from the configuration server 102. Once the firmware 316 has been retrieved and stored within the image file 226, the host configuration tool 308 may update a firmware in the host computer 104 with the new firmware 316.

According to embodiments, all of the software components illustrated in FIG. 3 as being stored within the image file 226 are stored within a single partition. According to other embodiments, multiple partitions 302A-3032C may be utilized to store different software components. For instance, as shown in FIG. 3, the host firmware runtime API 304, the service processor runtime API 306, the host configuration tool 308, and the Web browser program 310, are stored within the partition 302A. The host operating system 116B and the drivers 312 are stored within the partition 302B. The scripts 314 and the firmware 316 are stored within the partition 302C. By storing the various software components in different partitions of the image file, each of the partitions 302A-302C may be updated separately without updating the entire image file 226. It should be appreciated that other configurations of partitions and software components may be utilized.

Figure 4:
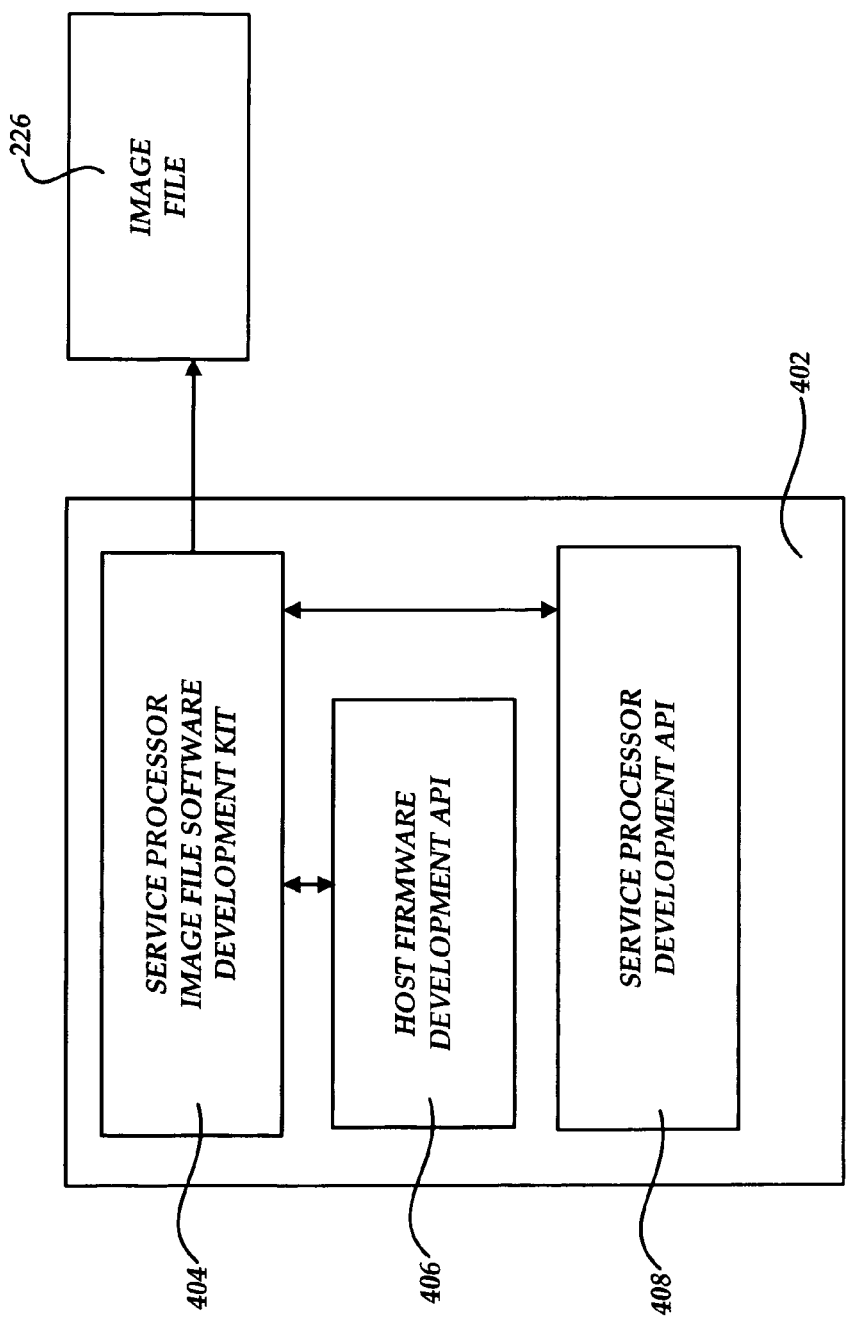
FIG. 4 is a software architecture diagram showing aspects of an image file software development kit provided in one embodiment presented herein.

FIG. 4 is a software architecture diagram showing aspects of an image file software development environment provided in one embodiment presented herein. In particular, FIG. 4 shows aspects of a software development environment 402 for use in creating the image file 226. As shown in FIG. 4, the software development environment 402 includes a service processor image file software development kit ("SDK") 404. The service processor image file SDK 404 includes software components to assist in the creation of the image file 226. For instance, the software service processor image file SKD 404 may allow a user to configure the firmware 316, scripts 314, host operating system 116B, and drivers 312 that are installed in the image file 226. Additionally, the environment 402 includes a host firmware development API 406 that allows for development time coding against the host firmware runtime API 304. Similarly, a service processor development API 408 is provided that allows for programmers to code against the service processor runtime API 306.

The service processor image file SDK 404 may also provide functionality for configuring the operation of the host configuration tool 308 and the graphical user interface that is provided through the Web browser program 310. Once a user has configured the aspects of the software components stored in the image file 226, the service processor image file SDK 404 is operative to generate the image file 226 in the designated manner. Additional functionality may also be provided for uploading the generated image file 226 to the service processor 108 for storage on the file system 224 of the NAND flash memory 222.

Figure 5:
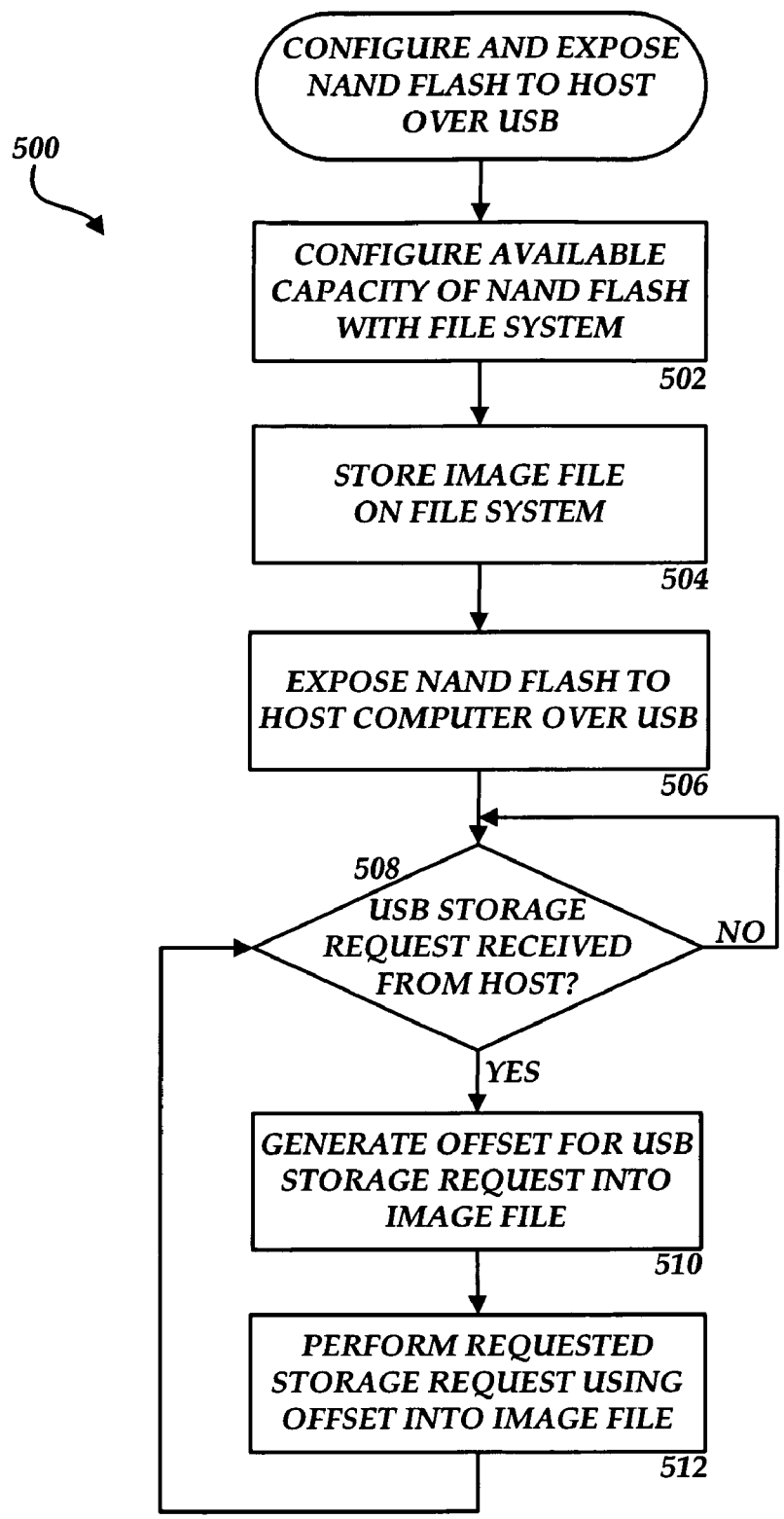
FIG. 5 is a flow diagram showing aspects of the operation of a service processor provided in one embodiment presented herein.

FIG. 5 is a flow diagram showing operations performed by the service processor 108 in one embodiment presented herein. In particular, FIG. 5 is a flow diagram illustrating a routine 500 that shows the operation of the service processor 108 provided in one embodiment presented herein. It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 beings at operation 502, where the available storage capacity of the NAND flash memory 222 is configured by the file system manager 216. In particular, the file system manager 216 formats the available storage capacity of the NAND flash memory 222 with the file system 224. It should be appreciated that the file system manager 216 provides functionality for identifying and remapping bad sectors within the NAND flash memory 222. This process is transparent to the operation of the USB driver layer 218.

From operation 502, the routine 500 continues to operation 504 where the service processor 108 stores the image file 226 on the file system 224. As discussed above, the image file 226 is a monolithic file stored within the file system 224 in the same manner that any other file would be stored within a file system. Once the image file 226 has been stored within the file system 224, the routine 500 continues to operation 506, where the contents of the file system 224 are exposed to the host computer 104 as a mass storage device. As discussed above, the file system 224 is exposed to the host computer 104 via the USB controller 206 and appears to the host computer 104 as would any other USB mass storage device.

From operation 506, the routine 500 continues to operation 508, where the service processor 108 determines whether a storage request was received from the host computer 104 via the USB controller 206. In response to receiving such a request, the routine 500 continues to operation 510, where the USB driver layer 218 generates an offset into the image file 226 for the storage request. Once the offset has been generated into the image file 226, the routine 500 continues to operation 512, where the USB driver layer 218 performs the storage request using the generated offset. For instance, an offset may be generated to perform a read or write operation within a portion of the image file 226. Once the request has been performed by the USB driver layer 218, the results of the request are returned to the host computer 104 in response to the original storage request. From operation 512, the routine 500 returns to operation 508 where additional storage requests from the host computer 104 are processed in a similar manner.

Figure 6:
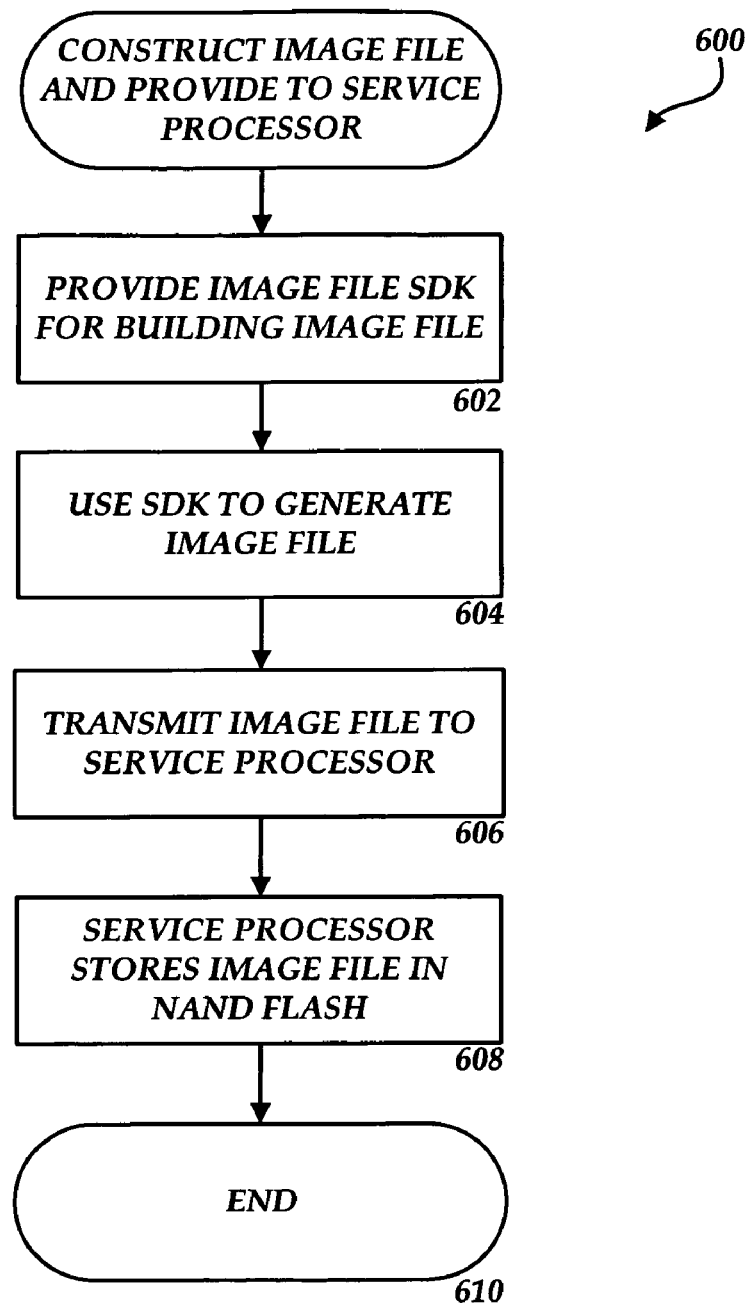
FIG. 6 is a flow diagram showing aspects of one process provided herein for constructing an image file for use by a service processor in one embodiment.

FIG. 6 is a flow diagram showing aspects of one process provided herein for constructing an image file for use by a service processor 108 in one embodiment. In particular, FIG. 6 shows a routine 600 for constructing an image file 226 and providing the image file to the service processor 108. The routine 600 begins at operation 602, where the service processor image file SDK 404 is provided for use in generating the image file 226. The routine 600 then continues to operation 604, where the service processor image file SDK 404 is utilized in the manner described above to generate the image file 226. Once the image file 226 has been generated, the routine 600 continues to operation 606, where the image file 226 is transmitted to the service processor 108 for storage on the NAND flash memory 222. When the service processor 108 receives the image file 226, it stores the image file 226 in the NAND flash memory 222. The service processor 108 then exposes the contents of the NAND flash memory 222 to the host computer 104 as a mass storage device in the manner described above. From operation 608, the routine 600 continues to operation 610 where it ends.

Figure 7:
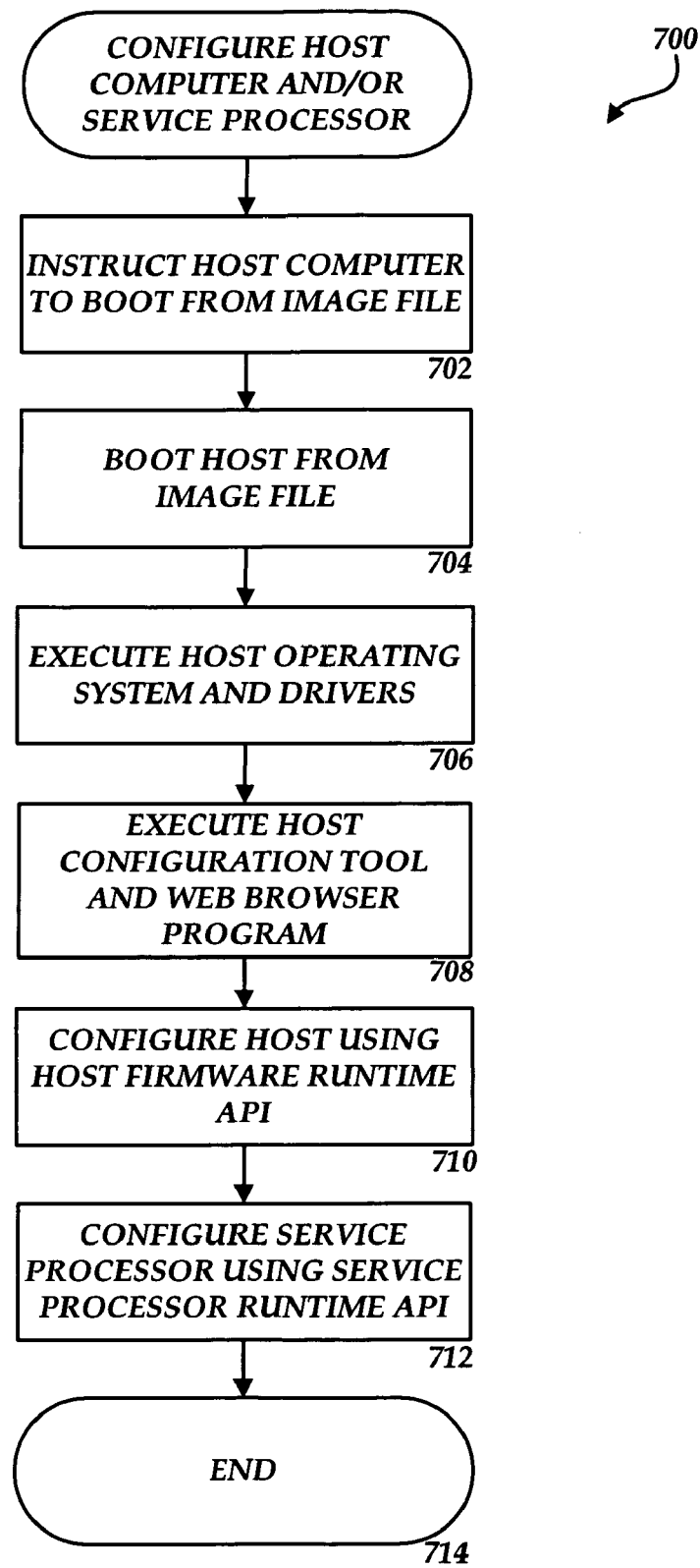
FIG. 7 is a flow diagram showing aspects of an illustrative process for configuring a host computer and a service processor utilizing software components stored on the service processor in one implementation provided herein.

FIG. 7 is a flow diagram showing aspects of an illustrative process for configuring a host computer 104 and a service processor 108 utilizing software components stored on a NAND flash memory 222 exposed by the service processor 108 in one implementation provided herein. In particular, FIG. 7 illustrates a routine 700 for configuring aspects of the operation of the host computer 104 and/or the service processor 108. The routine 700 begins as operation 702, where the service processor 108 instructs the host computer 104 to restart and boot itself from the host operating system 116B stored in the image file 226. As described above, the service processor 108 may utilize IPMI or another interface to provide such an instruction to the host computer 104. From operation 702, the routine 700 continues to operation 704 where the host computer 104 boots itself from the host operating system 116B stored in the image file 226. The routine 700 then continues to operation 706, where the host operating system 116B and the drivers 312 are executed by the host computer 104.

From operation 706, the routine 700 continues to operation 708, where the host computer 104 executes the host configuration tool 308 and, as necessary, the Web browser program 310. As discussed, the Web browser program 310 may be utilized by the host configuration tool 308 to provide a suitable graphical user interface for configuring aspects of the host computer 104. Additionally, scripts 314 or other program code may be executed by host configuration tool 308 to configure aspects of the host computer 104 in an automated manner. For instance, the host firmware runtime API 304 may be utilized by the host configuration tool 308 to configure aspects of the operation of a firmware utilized by the host computer 104. This occurs at operation 710.

In addition to configuring aspects of the operation of the host computer 104, the host configuration tool 308 may also utilize the service processor runtime API 306 to configure aspects of the operation of the service processor 108. For instance, this functionality may be utilized to identify the configuration server 102 to the service processor 108, to define the frequency with which the service processor 108 should check for updates from the configuration server 102, or to perform other types of configuration of the service processor 108. This functionality occurs at operation 712. From operation 712, the routine 700 continues to operation 714, where it ends.

Figure 8:
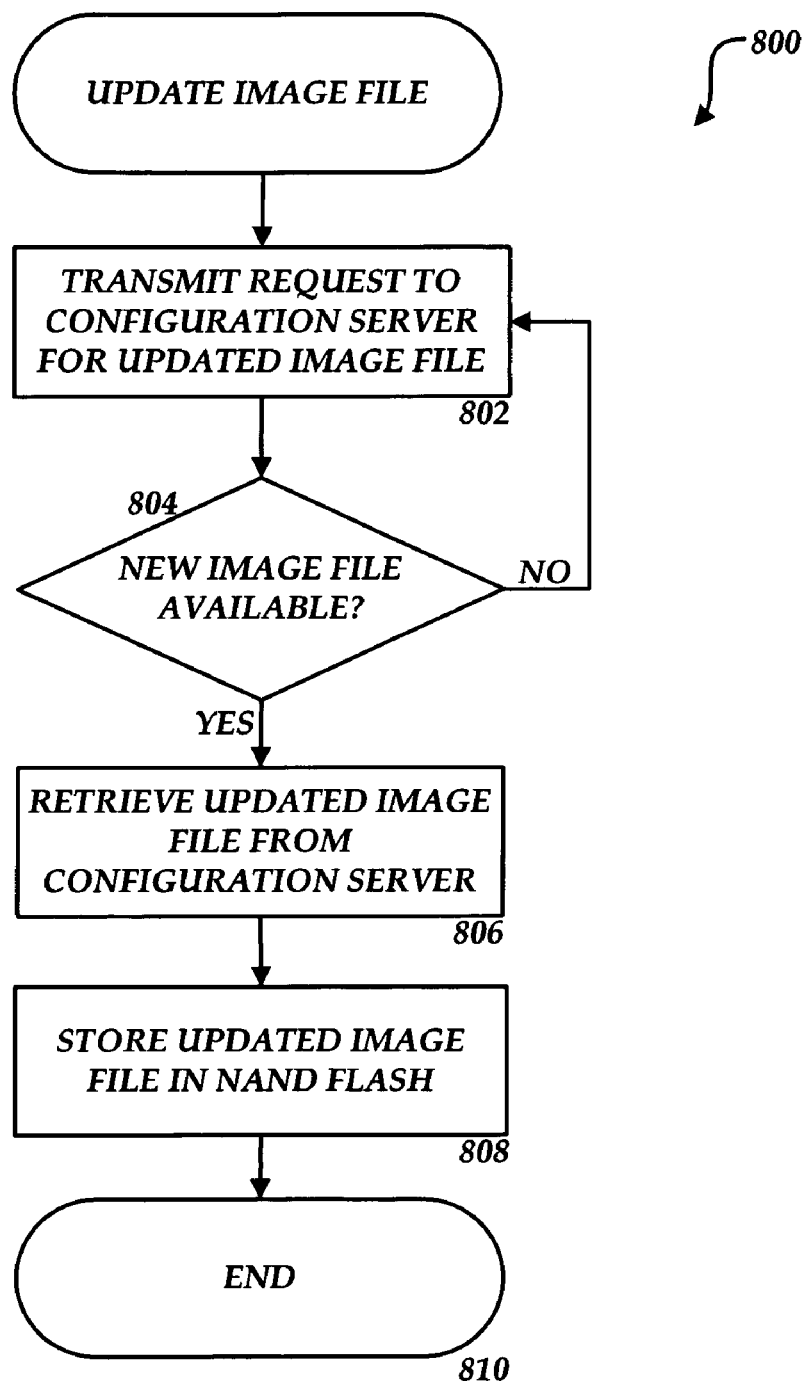
FIG. 8 is a flow diagram showing aspects of one process provided herein for updating an image file stored on a service processor in one implementation.

FIG. 8 is a flow diagram showing aspects of one process provided herein for updating an image file 226 stored on a service processor 108 in one implementation. In particular, FIG. 8 shows a routine 800 for updating the image file 226 stored at the service processor 108. The routine 800 begins at operation 802, where the service processor 108 transmits a request to the configuration server 102 for an updated image file 226. The routine 800 then continues to operation 804, where the service processor 800 determines whether the configuration server 102 indicated that a new image 226 is available. If no new image file is available, the routine 800 returns to operation 802 where a subsequent request is transmitted to the configuration server 102 at a later time. If a new image file is available, however, the routine 800 continues from operation 804 to operation 806.

At operation 806, the service processor 108 retrieves the updated image file 226 from the configuration server 102. Once the updated image file has been obtained from the configuration server 102, the routine 800 continues to operation 808, where the service processor 108 stores the updated image file 226 in the NAND flash memory 222. Once the updated image file 226 has been stored in the NAND flash memory 222, the service processor 108 may instruct the host computer 104 to reboot itself from the image file 226 in the manner described above. From operation 808, the routine 800 continues to operation 810, where it ends.

Figure 9:
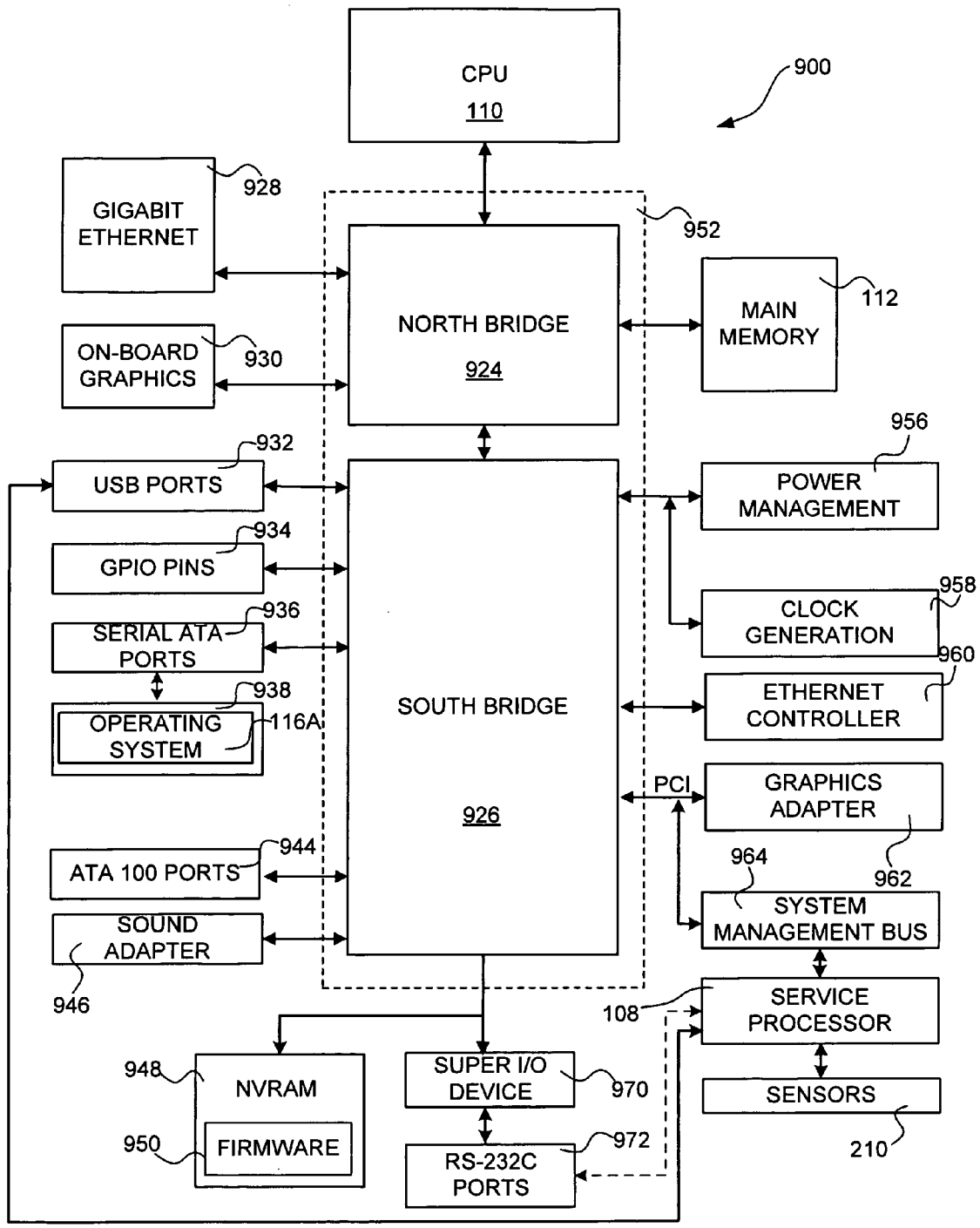
FIG. 9 is a computer architecture diagram showing an illustrative computer architecture for implementing the host computer and the configuration server presented herein.

FIG. 9 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 9 shows a computer architecture for an illustrative computer 900 that may be utilized to embody the hardware and software components presented herein for the host computer 104. Some or all of the architecture shown in FIG. 9 may also be utilized to implement the configuration server 102. As discussed above, other types of computers and computing devices may also be utilized to implement the embodiments presented herein.

The computer 900 includes a baseboard, or "motherboard", which is a printed circuit board to which a multitude of components or devices may be connected by way of a system bus or other electrical communication path. In one illustrative embodiment, a CPU 110 operates in conjunction with a chipset 952. The CPU 110 is a standard central processor that performs arithmetic and logical operations necessary for the operation of the computer. The computer 900 may include a multitude of CPUs 110.

The chipset 952 includes a north bridge 924 and a south bridge 926. The north bridge 924 provides an interface between the CPU 922 and the remainder of the computer 900. The north bridge 924 also provides an interface to a random access memory ("RAM") used as the main memory 112 in the computer 900 and, possibly, to an on-board graphics adapter 930. The north bridge 924 may also include functionality for providing networking functionality through a gigabit Ethernet adapter 928. The gigabit Ethernet adapter 928 is capable of connecting the computer 900 to another computer via a network. Connections that may be made by the network adapter 928 may include LAN or WAN connections. LAN and WAN networking environments are commonplace in offices, enterprise-wide computer networks, intranets, and the Internet. The north bridge 924 is connected to the south bridge 926.

The south bridge 926 is responsible for controlling many of the input/output functions of the computer 900. In particular, the south bridge 926 may provide one or more universal serial bus ("USB") ports 932, a sound adapter 946, an Ethernet controller 960, and one or more general-purpose input/output ("GPIO") pins 934. The south bridge 926 may also provide a bus for interfacing peripheral card devices such as a graphics adapter 962. In one embodiment, the bus comprises a peripheral component interconnect ("PCI") bus. The south bridge 926 may also provide a system management bus 964 for use in managing the various components of the computer 900. Additional details regarding the operation of the system management bus 964 and its connected components are provided below.

The south bridge 926 is also operative to provide one or more interfaces for connecting mass storage devices to the computer 900. For instance, according to an embodiment, the south bridge 926 includes a serial advanced technology attachment ("SATA") adapter for providing one or more SATA ports 936 and an ATA 100 adapter for providing one or more ATA 100 ports 944. The SATA ports 936 and the ATA 100 ports 944 may be, in turn, connected to one or more mass storage devices such as the SATA disk drive 938 storing an operating system 116A and application programs. As known to those skilled in the art, an operating system 116A comprises a set of programs that control operations of a computer and allocation of resources. An application program is software that runs on top of the operating system software, or other runtime environment, and uses computer resources to perform application specific tasks desired by the user. According to one embodiment of the invention, the operating system 116A comprises the LINUX operating system. According to another embodiment of the invention the operating system 116A comprises the WINDOWS SERVER operating system from MICROSOFT CORPORATION. According to another embodiment, the operating system 116A comprises the UNIX or SOLARIS operating system. It should be appreciated that other operating systems may also be utilized.

The mass storage devices connected to the south bridge 926, and their associated computer-readable media, provide non-volatile storage for the computer 900. Although the description of computer-readable media contained herein refers to a mass storage device, such as a hard disk or CD-ROM drive, it should be appreciated by those skilled in the art that computer-readable media can be any available media that can be accessed by the computer 900. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information.

A low pin count ("LPC") interface may also be provided by the south bridge 926 for connecting a "Super I/O" device 970. The Super I/O device 970 is responsible for providing a number of input/output ports, including a keyboard port, a mouse port, a serial interface 972, a parallel port, and other types of input/output ports. The LPC interface may also connect a computer storage media such as a ROM or a flash memory such as a NVRAM 948 for storing the firmware 950 that includes program code containing the basic routines that help to start up the computer 900 and to transfer information between elements within the computer 900.

As described briefly above, the south bridge 926 may include a system management bus 964. The system management bus 964 may be connected to the service processor 108. As discussed above, the service processor 108 includes functionality for monitors the operation of the computer system 900 and for configuring aspects of its operation. In addition to providing the functionality described herein for configuring the computer 900, the service processor 108 may also be configured to monitor health-related aspects associated with the computer system 900, such as, but not limited to, the temperature of one or more components of the computer system 900, speed of rotational components (e.g., spindle motor, CPU Fan, etc.) within the system, the voltage across or applied to one or more components within the system 900, and the available or used capacity of memory devices within the system 900. To accomplish these monitoring functions, the service processor 108 is communicatively connected to one or more components by way of the management bus 964. In an embodiment, these components include sensor devices 210 for measuring various operating and performance-related parameters within the computer system 900. The sensor devices 210 may be either hardware or software based components configured or programmed to measure or detect one or more of the various operating and performance-related parameters. The service processor 108 also includes the additional functionality described above for configuring aspects of the operation of the computer 900. In this regard, the service processor 108 includes an interface to the USB ports 932 provided by the computer 900.

It should be appreciated that the computer 900 may comprise other types of computing devices, including hand-held computers, embedded computer systems, personal digital assistants, and other types of computing devices known to those skilled in the art. It is also contemplated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for configuring the operation of a host computer using a service processor are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting.

Various modifications and changes may be made to the subject matter described herein without following the example embodiments and applications illustrated and described, and without departing from the true spirit and scope of the present invention, which is set forth in the following claims.

What is claimed is:

1. A service processor for configuring and managing a host computer having a first processor that is separate from the service processor, the service processor comprising:
   a second processor that is separate from the first processor;
   a NAND flash memory accessible to the second processor and offering a storage capacity that is organized using a file system;
   a monolithic image file stored on the file system that stores a host configuration tool executable by the host computer;
   a hardware interface coupled to the second processor and coupled to the host computer, the hardware interface enabled for communicating with the host computer; and
   a firmware containing computer-executable instructions which, when executed by the second processor, will cause the service processor to expose the NAND flash memory to the host computer as a storage device on the hardware interface, to instruct the host computer to execute the host configuration tool, to receive a storage request from the host computer on the hardware interface, to generate an offset for the storage request into the monolithic image file in response to receiving the storage request, and to perform the storage request using the generated offset into the monolithic image file,
   wherein the service processor is provided at the host computer.

2. The service processor of claim 1, wherein the image file stores an operating system executable by the host computer, and hardware drivers usable by the operating system for interfacing with one or more hardware devices of the host computer, and wherein the firmware contains further computer-executable instructions which, when executed by the processor, will cause the service processor to instruct the host computer to execute the operating system stored in the image file.

3. The service processor of claim 2, wherein the host configuration tool is operative to configure one or more aspects of the operation of the host computer.

4. The service processor of claim 3, wherein the image file further stores a Web browser program and wherein the host configuration tool is further operative to utilize the Web Browser program to provide a visual display for configuring the one or more aspects of the operation of the host computer.

5. The service processor of claim 3, wherein the image file further stores a host firmware runtime application programming interface (API), and wherein the host configuration tool is operative to execute the host firmware runtime API to configure one or more aspects of the operation of a firmware utilized by the host computer.

6. The service processor of claim 3, wherein the image file further stores a host firmware, and wherein the host configuration tool is further operative to update a firmware utilized by the host computer using the host firmware stored in the image file.

7. The service processor of claim 5, wherein the firmware contains further computer-executable instructions which, when executed by the second processor, will cause the service processor to obtain the host firmware from a network connected configuration server.

8. The service processor of claim 3, wherein the firmware contains further computer-executable instructions which, when executed by the second processor, will cause the service processor to obtain an updated image file from a network connected configuration server and to replace the image file stored in the NAND flash memory with the updated image file.

9. The service processor of claim 3, wherein the image file further stores a service processor runtime application programming interface (API), and wherein the host configuration tool is operative to execute the service processor runtime API to configure one or more aspects of the operation of the service processor.

10. The service processor of claim 3, wherein the image file further stores one or more configuration scripts executable by the host computer, and wherein the firmware contains further computer-executable instructions which, when executed by the second processor, will cause the service processor to instruct the host computer to execute the one or more configuration scripts to thereby configure one or more aspects of the operation of the host computer.

11. A method for configuring a host computer having a first processor using a service processor that is separate from the first processor, the method comprising:
   organizing an available storage capacity of a NAND flash memory on the service processor using a file system;
   storing a monolithic image file on the file system, the image file storing a host configuration tool executable by the host computer;
   exposing the available storage capacity of the NAND flash memory on the service processor to the host computer as a storage device via a hardware interface on the service processor;
   instructing the host computer to execute the host configuration tool from the image file;
   receiving a storage request from the host computer on the hardware interface;
   generating an offset for the storage request into the monolithic image file in response to receiving the storage request; and
   performing the storage request using the generated offset into the monolithic image file, wherein the service processor is provided at the host computer.

12. The method of claim 11, wherein the image file stores an operating system executable by the host computer, and wherein the method further comprises instructing the host computer to boot the operating system from the image file.

13. The method of claim 12, wherein the image file further stores a Web browser program, and wherein the host configuration tool is further operative to utilize the Web browser program to provide a visual display for configuring the one or more aspects of the operation of the host computer.

14. The method of claim 13, wherein the image file further stores a host firmware for utilization by the host computer, and wherein the host configuration tool is further operative to update a firmware utilized by the host computer using the host firmware stored in the image file.

15. The method of claim 14, wherein the image file further stores a host firmware application programming interface (API), and wherein the host configuration tool is further operative to execute the host firmware API from the image file to configure one or more aspects of the operation of the firmware utilized by the host computer.

16. The method of claim 15, wherein the image file further stores one or more configuration scripts which, when executed by the host computer, are operative to configure one or more aspects of the operation of the host computer, and wherein the method further comprises instructing the host computer to execute the configuration scripts from the image file.

17. The method of claim 16, further comprising:
periodically connecting to a network connected configuration server to obtain an updated image file; and
replacing the image file stored in the NAND flash memory with the updated image file.

18. A service processor capable of configuring and managing a host computer having a first processor, the service processor comprising:
a second processor that is separate from the first processor;
a NAND flash memory accessible to the second processor and having a storage capacity that is organized using a file system;
a monolithic image file stored on the file system, the monolithic image storing a host operating system, a host firmware, a host firmware runtime application programming interface (API), and a host configuration tool executable on the host operating system and configured to utilize services exposed by the host firmware runtime API to update a firmware in the host computer using the host firmware stored in the image file;
a hardware interface coupled to the second processor and coupled to the host computer, the hardware interface enabled for communicating with the host computer; and
the firmware containing computer-executable instructions which, when executed by the second processor, will cause the service processor to expose the NAND flash memory to the host computer as a storage device on the hardware interface, and to instruct the host computer to boot the operating system from the image file and to execute the host configuration tool to update the firmware on the host computer,
wherein the service processor is provided at the host computer.

* * * * *